H. SPÜHL.
TRIMMING MACHINE.
APPLICATION FILED APR. 20, 1912.

1,046,671.

Patented Dec. 10, 1912.
3 SHEETS—SHEET 2.

Witnesses:
L. Hockinson
C. S. Brown

Inventor.
Heinrich Spühl
by Foster Freeman Watson & Cox
Attorneys

H. SPÜHL.
TRIMMING MACHINE.
APPLICATION FILED APR. 20, 1912.
1,046,671.
Patented Dec. 10, 1912.
3 SHEETS—SHEET 3.
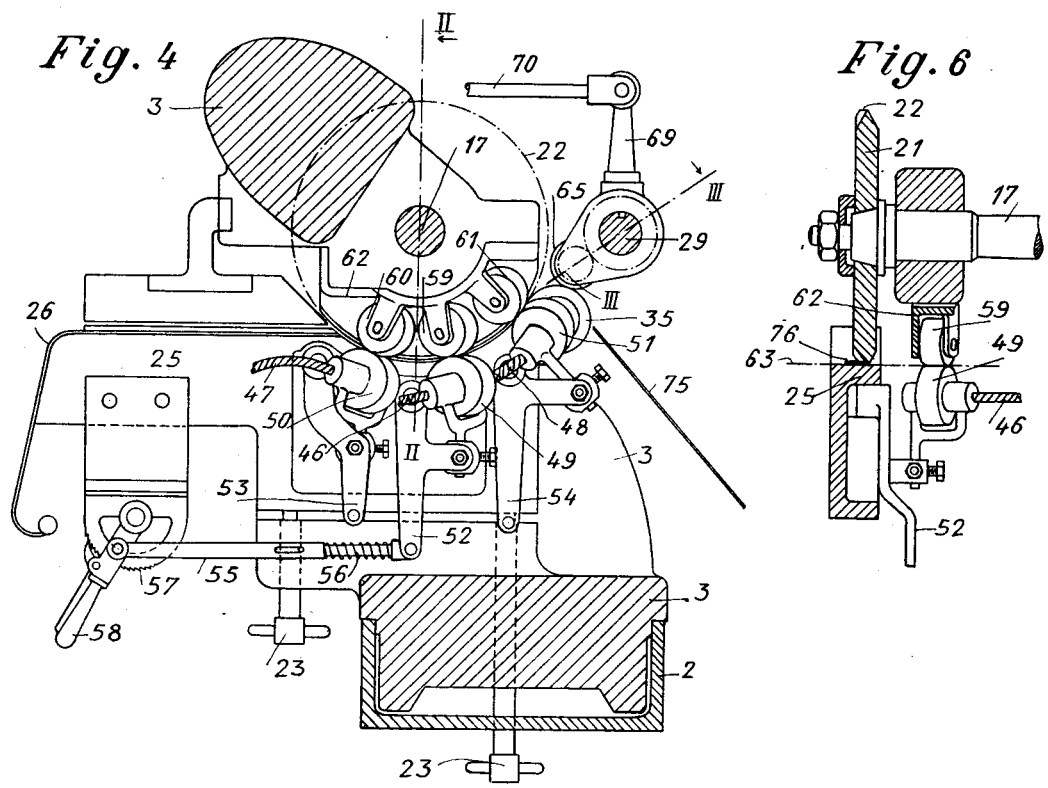
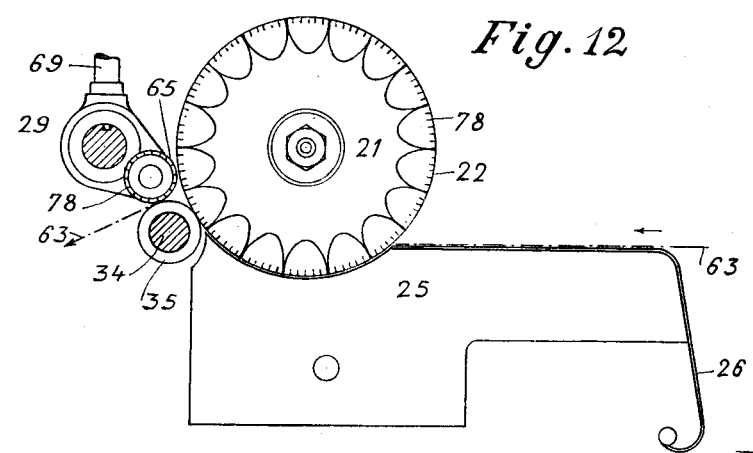
Witnesses:
L. Hockinson
C. D. Brown
Inventor:
Heinrich Spühl
by Foster Freeman Watson & Coit
Attorneys

UNITED STATES PATENT OFFICE.

HEINRICH SPÜHL, OF ST. GALLEN, SWITZERLAND.

TRIMMING-MACHINE.

1,046,671.  Specification of Letters Patent.  Patented Dec. 10, 1912.

Application filed April 20, 1912. Serial No. 692,157.

*To all whom it may concern:*

Be it known that I, HEINRICH SPÜHL, a citizen of the Confederacy of Switzerland, and resident of 75 Rohrschacherstrasse, St.
Gallen, Switzerland, have invented certain new and useful Improvements in Trimming-Machines, of which the following is a specification.

This invention relates to an improved machine for trimming or cutting festooned embroidery into strips and has particularly for its object to provide mechanism for feeding the work accurately to the cutter.

According to the present invention, a rotatable cutter whose cutting edge corresponds to the particular festoon to be trimmed, rotates in a concentrically concaved work table arranged in so close proximity to the edge of the cutter that only the unembroidered part of the work can pass between the work table and the cutter while the festooned part of the work is drawn forwardly and laterally against the cutting edge of the cutter by means of rotatably driven members or rollers arranged laterally of the cutter and inclined thereto, the work being cut as it passes between the cutter and a platen-roller arranged in the rear of the work table.

In order that the invention may be more clearly understood, reference will be hereinafter made to the accompanying drawings which illustrate the preferred method of carrying out the invention.

Figure 1:
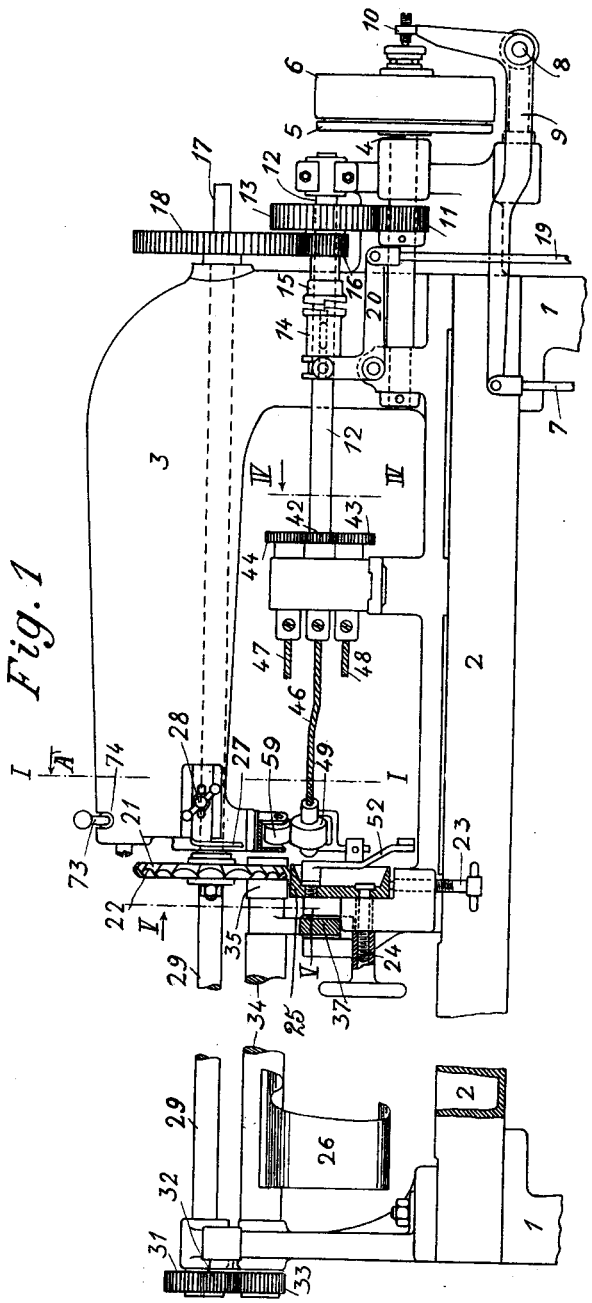
Figure 2:
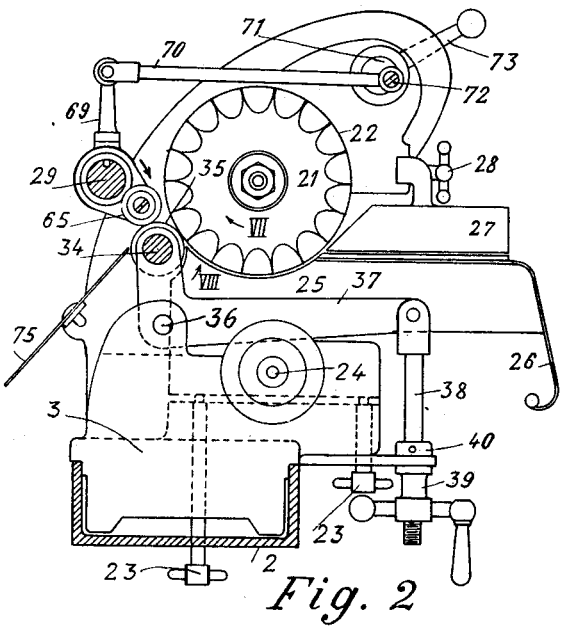
Figure 5:
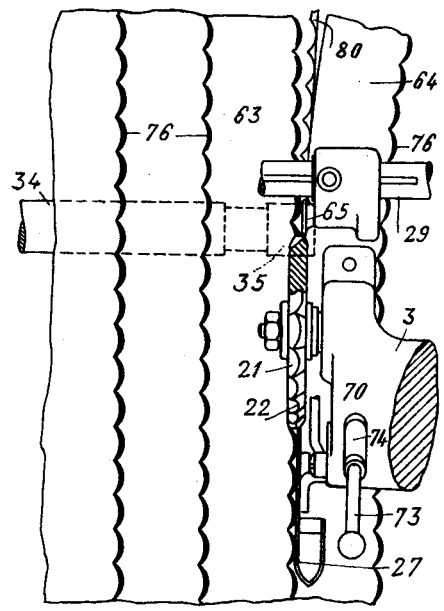
Figure 3:
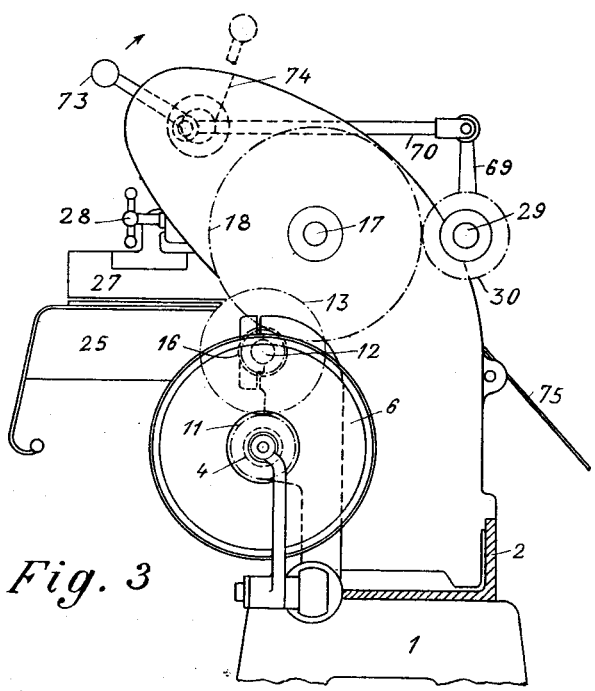
Figures 10, 11:
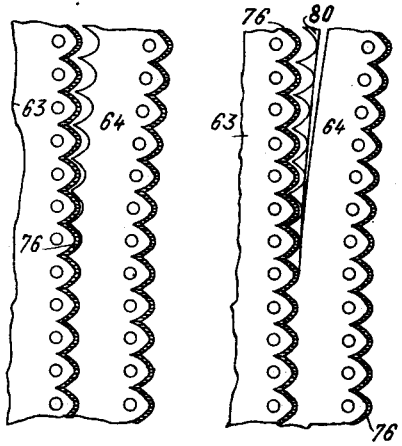

Figure 1 is a front view of the embroidery machine, partially broken away and showing some of the parts in section for the sake of clearness. Fig. 2 is an end view of the machine from the left of Fig. 1. Fig. 3 is an end view taken from the right of Fig. 1, and Fig. 4 is a transverse section on the line I—I of Fig. 1, looking in the direction of the arrow A. Fig. 5 is a detail plan view of the cutter and adjacent parts showing the work in position. Figs. 6 and 7 are detail views taken in section on the lines II—II and III—III respectively of Fig. 4. Fig. 8 is a transverse section on the line IV—IV of Fig. 1, looking in the direction of the arrow.
Fig. 9 is a detail view of the feed mechanism for holding the work laterally against the cutter. Figs. 10 and 11 show two samples of festooned work partially trimmed. Fig. 12 is a detail view shown of a slightly modi-
fied form of rotatable cutter, taken in section on the line V—V of Fig. 1.

1 designates suitable standards upon which is mounted a U-shaped bed 2 in which is supported a bracket arm 3. Rotatably mounted in the bracket arm 3 is a main driving shaft 4 upon which is fixed a friction member 5 coöperating with an axially movable friction member 6 adapted to be driven from any suitable source of power. The movable member 6 of the friction clutch is adapted to be actuated from a treadle-rod 7 through the medium of a bell crank 9 pivoted at 8 and carrying a pressure screw 10 bearing against the movable member 6. Mounted on the driving shaft 4 is a gear wheel 11 gearing with a gear wheel 13 fixed upon a counter shaft 12 on which is splined the movable member 14 of a claw clutch adapted to engage with the fixed member 15 which carries a gear wheel 16 gearing with the gear wheel 18 mounted on the shaft 17. The movable member 14 is adapted to be engaged or disengaged with the fixed member 15 of the claw clutch through the medium of a treadle rod 19 operating a bell crank 20 engaging the movable member 14. It will of course be readily understood that the clutch members 14 and 15 must first be brought into engagement before motion is transmitted to the main shaft 17. Mounted on the shaft 17 is a rotatable cutter 21 whose cutting edge 22 comprises a plurality of sections each of which corresponds to the form of the festoon to be trimmed or cut out. The lower part of the cutter 21 rotates in a concentrically concaved work table 25 (Figs. 1, 2 and 9) which extends rearwardly to the platen roller 35 and is capable of being adjusted vertically by means of adjusting screws 23 and secured in the position of adjustment by means of screws 24, the space between the periphery of the knife 21 and the concentric work table 25 being so adjusted that only the unembroidered part of the work can pass therethrough, the embroidered or festooned part being incapable of passing therethrough owing to its greater thickness.

26 designates a guide plate detachably fitted on the work table 25 and 27 (Figs. 1, 2 and 5) designates a work guide or straight edge adjustable on the bracket arm 3 relatively to a knife 21 and adapted to be secured in adjusted position by means of bolts 28, the festoon bearing against the guide 27 during the forward feed in order to be guided correctly to the cutter 21. The toothed wheel 18 on the cutter shaft 17 also meshes with a toothed gear wheel 30 mounted on a parallel shaft 29 which carries at its other end a gear wheel 31 driving a gear wheel 33 on a shaft 34 through an idle gear wheel 32. On the shaft 34 is mounted the platen roller 35 which is constructed of hard steel and serves as the cutting bed for the cutter 21. The right hand end of the shaft 34 (Fig. 1) is carried in bearings in a bell crank 37 (Figs. 1 and 2) pivoted on a pin 36 and capable of being adjusted by means of a screwed spindle 38 and nut 39 so as to adjust the roller 35 relatively to the cutter 21. A collar 40 fixed on the spindle 38 limits the adjustment of the platen roller 35 toward the cutter 31.

In order to draw the festoon closely and laterally against the cutting edge 22 of the cutter during the forward feed and thus obviate displacement between the cutter and its work, a toothed wheel 41 (Fig. 8) is mounted on the counter shaft 12, this wheel 41 driving gear wheels 44 and 45 through the medium of idle wheels 42 and 43 respectively, each gear wheel 41, 44, and 45 driving a corresponding series of rollers 49, 50 and 51 through flexible shafts 46, 47 and 48 respectively (see Fig. 9). The axles of the rollers 49, 50, and 51 are inclined to the plane of the cutter 21 in order to draw the festoon laterally against the cutting edge 22 without however affecting the forward feed of the work in the direction indicated by the arrow VI in Fig. 9. Each roller 49, 50 and 51 is carried by a pivoted lever 52, 53 and 54 respectively as shown in Figs. 1 and 4 whereby the rollers are held in operative position, each lever 52, 53 and 54 being adjustable by means of suitable mechanism, as shown in Fig. 4 comprising a telescopic rod 55 movable against the action of a spring 56 by means of a pivoted hand lever 58 having a spring dog engaging in a toothed segment 57, the operating mechanism for the levers 53 and 54 being omitted in Fig. 4 for the sake of clearness. It will be readily understood that by adjusting the position of the levers 52, 53 and 54 the pressure of the rollers 49, 50 and 51 upon the work can be correspondingly varied. Co-operating with the rollers 49, 50 and 51 are correspondingly inclined counter rollers 59, 60 and 61 respectively which are rotatably mounted in fixed bearings in a carrier 62, secured to the bracket arm 3. It will be readily understood that the work 63 is fed between the rollers 49, 50 and 51 and the counter rollers 59, 60 and 61 respectively.

In order to cut off the unembroidered vandyked edge 80 (Figs. 5 and 11) of the separated strip 64, a circular knife 65 (Figs. 2 and 5) is mounted in proximity to the cutter 21 and brought to bear against the platen roller 35, and is mounted so near the delivery or rearward end of the work table 25, that the work may be fed to the circular knife 65 owing to its stiffness and without providing any special feeding mechanism. The circular knife 65 is mounted on a stud 66 (Fig. 7) which carries a toothed wheel 67 gearing with a toothed wheel 68 splined upon the shaft 29. The stud 66 is carried by a bell crank 69 (Figs. 2, 4 and 7) pivoted on the hub of the gear wheel 68 and adjustable through the medium of a connecting rod 70 and crank pin 72 mounted upon an eccentric 71 rotatable in the carrier arm 3 and adjustable by means of a handle 73 projecting through a slot 74 in the bracket arm so that the knife 65 may be approached to or withdrawn from the platen roller 35. As the axis of the crank pin 72 lies somewhat below the rotatable axis of the eccentric 71 when the knife 65 is in its operative position, the knife is automatically held in working position.

75 designates a delivery plate over which the work is delivered (Figs. 2 and 3).

The *modus operandi* is as follows: After the work has been fed between the cutter 21 and work table 25 by hand and the festooned part brought into corresponding engagement with the cutting edge 22 of the cutter, the friction coupling 5, 6 is thrown into gear thus rotating the drawing rollers 49, 50 and 51, which, coacting with the counter rollers 59, 60 and 61, draw the festoon against the cutting edge 22 of the cutter and simultaneously feed the work to the platen roller 35. After it has been ascertained that the contour of the festoon is accurately adjusted to the cutting edge of the cutter the claw clutch 14, 15 is thrown into gear and the cutter 21 and platen roller 35 rotated in the direction of the arrows 7 and 8 respectively of Fig. 2. The cutter 21 coacting with the platen roller 35 thus cuts or separates the work close up to the festoon 76, delivering the work over the delivery plate 75 to any suitable receptacle and delivering the separated strip either in like manner or to a cutting apparatus. During the cutting out or trimming, the cutter 21 and platen roller 45 as well as the drawing rollers 49, 50 and 51 and the counter rollers 59, 60 and 61 guide the work continually in a straight path beneath the cutter 21 while the rollers 49, 50, 51, 59, 60 and 61 constantly draw the festooned part of the work passing over the work table 25 into the cutting position laterally against the cutting edge 22 so that incorrect cutting out or cutting of the festoon is practically entirely obviated.

If the vandyked edge 80 of the separated strip 64 is to be cut straight as shown in Figs. 5 and 11, the knife 56 is brought to bear against the circumference of the platen roller 35 through the medium of the parts 73, 72, 71, 70 and 69 whereupon the edge of the separated strip will be cut straight simultaneously with the cutting out of the festoon which is of great advantage over the usual method of cutting out which is illustrated in Fig. 10 which necessitates the vandyked edges to be specially cut after leaving the machine. The pressure of the rollers 49, 50 and 51 upon the work can be adjusted by means of the lever 58.

In the modification illustrated in Fig. 12 the cutter 21 and circular knife 65 are provided with small circumferential notches 78 arranged at regular distances apart whereby the work on passing through the machine will only be perforated, the only partially separated strips being held together by means of threads and thus presenting a much better appearance for purposes of sale especially when the embroidered strips are of narrow form, while those strips may be readily separated when required.

It will of course be understood that the number of drawing rollers may be varied according to requirements and that any other suitable form of driving mechanism may be employed.

I claim:—

1. A machine for trimming festooned embroidery, comprising a rotatable cutter whose cutting edge corresponds to the festoon, a platen roller coacting therewith, a concave work table concentric with said cutter and arranged in so close proximity to the edge of said cutter that only the unembroidered part of the work can pass between said work table and cutter, and means laterally of said cutter for feeding the work forwardly and the festooned part thereof laterally against the cutting edge of said cutter.

2. A machine for trimming festooned embroidery, comprising a rotatable cutter whose cutting edge corresponds to the festoon, a platen roller coacting therewith, a concave work table concentric with said cutter and arranged in so close proximity to the edge of said cutter that only the unembroidered part of the work can pass between said work table and cutter, and rotatably driven rollers arranged laterally of said cutter and inclined thereto, adapted to take the work between them and feed it forwardly and the festooned part thereof laterally against the cutting edge of said cutter.

3. A machine for trimming festooned embroidery, comprising a rotatable cutter whose cutting edge corresponds to the festoon, a platen roller coacting therewith, a concave work table concentric with said cutter and arranged in so close proximity to the edge of said cutter that only the unembroidered part of the work can pass between said work table and cutter, and means laterally of said cutter for feeding the work forwardly and the festooned part thereof laterally against the cutting edge of said cutter, and a circular rotatable knife in the rear of said cutter and work table and coacting with said platen roller.

4. A machine for trimming festooned embroidery, comprising a rotatable cutter whose cutting edge corresponds to the festoon, a platen roller coacting therewith, a concave work table concentric with said cutter and arranged in so close proximity to the edge of said cutter that only the unembroidered part of the work can pass between said work table and cutter, rotatably driven rollers arranged laterally of said cutter and inclined thereto, adapted to take the work between them and feed it forwardly and the festooned part thereof laterally against the cutting edge of said cutter, and a circular rotatable knife in the rear of said cutter and work table and coacting with said platen roller.

5. A machine for trimming festooned embroidery, comprising a cutter shaft, a cutter on said shaft whose cutting edge corresponds to the festoon, a platen roller coacting with said cutter, a concave work table concentric with said cutter and arranged in close proximity to the edge of said cutter, a driving shaft, a counter shaft, gearing intermediate said driving and counter shafts, rollers driven by said counter shaft and arranged laterally of said cutter and inclined thereto, so as to take the work between them, gearing intermediate said counter and cutter shafts and a clutch for throwing the last mentioned gearing into or out of operation.

6. A machine for trimming festooned embroidery, comprising a cutter shaft, a cutter on said shaft whose cutting edge corresponds to the festoon, a platen roller coacting with said cutter, a concave work table concentric with said cutter and arranged in close proximity to the edge of said cutter, a driving shaft, a counter shaft, gearing intermediate said driving and counter shafts, rollers driven by said counter shaft and arranged laterally of said cutter and inclined thereto, so as to take the work between them, gearing intermediate said counter and cutter shafts, a clutch for throwing the last mentioned gearing into or out of operation, and means for transmitting rotary motion from said cutter shaft to said platen roller.

7. A machine for trimming festooned embroidery, comprising a cutter shaft, a cutter on said shaft whose cutting edge corresponds to the festoon, a platen roller coacting with said cutter, a concave work table concentric with said cutter and arranged in close proximity to the edge of said cutter, a driving shaft, a counter shaft, gearing intermediate said driving and counter shafts, rollers driven by said counter shaft and arranged laterally of said cutter and inclined thereto so as to take the work between them, gearing intermediate said counter and cutter shafts, a clutch for throwing the last mentioned gearing into or out of operation, a circular rotatable knife in the rear of said cutter and work table and coacting with said platen roller, means for transmitting rotary motion from said cutter shaft to said knife, and means for transmitting rotary motion from said cutter shaft to said platen roller.

8. A machine for trimming festooned embroidery, comprising a rotatable cutter whose cutting edge corresponds to the festoon, a platen roller coacting therewith, a concave work table concentric with said cutter and arranged in so close proximity to the edge of said cutter that only the unembroidered part of the work can pass between said work table and cutter, means laterally of said cutter for feeding the work forwardly and the festooned part thereof laterally against the cutting edge of said cutter, a circular rotatable knife in the rear of said cutter and work table and coacting with said platen roller, and mechanism for adjusting the position of said knife in or out of contact with said platen roller.

9. A machine for trimming festooned embroidery, comprising a rotatable cutter whose cutting edge corresponds to the festoon, a platen roller coacting therewith, a concave work table concentric with said cutter and arranged in so close proximity to the edge of said cutter that only the unembroidered part of the work can pass between said work table and cutter, rotatably driven rollers arranged laterally of said cutter and inclined thereto, adapted to take the work between them and feed it forwardly and the festooned part thereof laterally against the cutting edge of said cutter, a circular rotatable knife in the rear of said cutter and work table and coacting with said platen roller, and mechanism for adjusting the position of said knife in or out of contact with said platen roller.

10. A machine for trimming festooned embroidery, comprising a cutter shaft, a cutter on said shaft whose cutting edge corresponds to the festoon, a platen roller coacting with said cutter, a concave work table concentric with said cutter and arranged in close proximity to the edge of said cutter, a driving shaft, a counter shaft, gearing intermediate said driving and counter shafts, rollers driven by said counter shaft and arranged laterally of said cutter and inclined thereto so as to take the work between them, gearing intermediate said counter and cutter shafts, and a clutch for throwing the last mentioned gearing into or out of operation, a circular rotatable knife in the rear of said cutter and work table, mechanism for adjusting the position of said knife in or out of contact with said platen roller, and means for transmitting rotary motion from said cutter shaft to said knife.

11. A machine for trimming festooned embroidery, comprising a carrier arm, a rotatably driven cutter carried thereby and whose cutting edge corresponds to the festoon, a platen roller coacting therewith, a concave work table concentric with said cutter and arranged in close proximity thereto, fixed bearings depending from said carrier arm at one side of said cutter, idle rollers rotatable in said bearings and inclined at an angle to said cutter, adjustable rollers coöperating with said idle rollers and adapted to hold the work between them and said idle rollers respectively, said adjustable rollers being inclined at an angle to said cutter corresponding to said idle rollers, and means for rotating said adjustable rollers.

12. A machine for trimming festooned embroidery, comprising a carrier arm, a rotatably driven cutter carried thereby and whose cutting edge corresponds to the festoon, a platen roller coacting therewith, a concave work table concentric with said cutter and arranged in close proximity thereto, fixed bearings depending from said carrier arm at one side of said cutter, idle rollers rotatable in said bearings and inclined at an angle to said cutter, adjustable rollers coöperating with said idle rollers and adapted to hold the work between them and said idle rollers respectively, said adjustable rollers being inclined at an angle to said cutter corresponding to said idle rollers, means for rotating said adjustable rollers and means for adjusting said adjustable rollers into or out of contact with said idle rollers.

13. A machine for trimming festooned embroidery, comprising a carrier arm, a cutter shaft rotatable in said carrier arm, a cutter on one end of said shaft whose cutting edge corresponds to the festoon, a platen roller coacting with said cutter, a concave work table concentric with said cutter and arranged in close proximity to the edge of said cutter, a driving shaft, a counter shaft gearing intermediate said driving shaft, counter shaft and cutter shaft respectively, fixed bearings carried by said carrier arm at one side of said cutter, idle rollers rotatable in said bearings and inclined at an angle to said cutter, adjustable rollers coöperating with said idle rollers and adapted to hold the work between them and said idle rollers respectively, said adjustable rollers being inclined at an angle to said cutter corresponding to said idle rollers, and flexible shafting for rotating said adjustable rollers from said counter shaft.

14. A machine for trimming festooned embroidery, comprising a rotatable cutter, whose cutting edge corresponds to the festoon, a platen roller coacting therewith, a concave work table concentric with said cutter, mechanism for vertically adjusting said work table into close proximity to the edge of said cutter, and means laterally of said cutter for feeding the work forwardly and the festoon part thereof laterally against the cutting edge of said cutter.

15. A machine for trimming festooned embroidery, comprising a rotatable cutter, whose cutting edge corresponds to the festoon, a platen roller coacting therewith, a concave work table concentric with said cutter, mechanism for vertically adjusting said work table into close proximity to the edge of said cutter and rotatably driven rollers arranged laterally of said cutter and inclined thereto, adapted to take the work between them and feed it forwardly and the festooned part thereof laterally against the cutting edge of said cutter.

16. A machine for trimming festooned embroidery, comprising a carrier arm, a rotatably driven cutter carried thereby and whose cutting edge corresponds to the festoon, a platen roller coacting therewith, a concave work table concentric with said cutter, mechanism for vertically adjusting said work table into close proximity to the edge of said cutter, fixed bearings depending from said carrier arm at one side of said cutter, idle rollers rotatable in said bearings and inclined at an angle to said cutter, adjustable rollers coöperating with said idle rollers and adapted to hold the work between them and said idle rollers respectively, said adjustable rollers being inclined at an angle to said cutter corresponding to said idle rollers, and means for rotating said adjustable rollers.

17. A machine for trimming festooned embroidery, comprising a rotatable cutter whose cutting edge corresponds to the festoon, a platen roller coacting therewith, means for adjusting said platen roller relatively to the cutting edge of said cutter, a concave work table concentric with said cutter and arranged in so close proximity to the edge of said cutter, that only the unembroidered part of the work can pass between said work table and cutter, and means laterally of said cutter for feeding the work forwardly and the festooned part thereof laterally against the cutting edge of said cutter.

18. A machine for trimming festooned embroidery, comprising a rotatable cutter whose cutting edge corresponds to the festoon, a platen roller coacting therewith, means for adjusting said platen roller relatively to the cutting edge of said cutter, a concave work table concentric with said cutter and arranged in so close proximity to the edge of said cutter that only the unembroidered part of the work can pass between said work table and cutter, and rotatably driven rollers arranged laterally of said cutter and inclined thereto, adapted to take the work between them and feed it forwardly and the festooned part thereof laterally against the cutting edge of said cutter.

19. A machine for trimming festooned embroidery, comprising a rotatable cutter whose cutting edge corresponds to the festoon, a platen roller coacting therewith, a concave work table concentric with said cutter, and arranged in so close proximity to the edge of said cutter that only the unembroidered part of the work can pass between said work table and cutter, means laterally of said cutter for feeding the work forwardly and the festooned part thereof laterally against the cutting edge of said cutter and an adjustable straight edge for guiding the festoon toward and in proper alinement with said cutter.

20. A machine for trimming festooned embroidery, comprising a rotatable cutter whose cutting edge corresponds to the festoon, a platen roller coacting therewith, a concave work table concentric with said cutter and arranged in so close proximity to the edge of said cutter that only the unembroidered part of the work can pass between said work table and cutter, rotatably driven rollers arranged laterally of said cutter and inclined thereto, adapted to take the work between them and feed it forwardly and the festooned part thereof laterally against the cutting edge of said cutter and an adjustable straight edge for guiding the festoon toward and in proper alinement with said cutter.

21. A machine for partially separating the festooned part from the unembroidered part of embroidered work comprising a rotatable cutter whose cutting edge corresponds to the festoon and is notched at intervals, a platen roller coacting therewith, a concave work table concentric with said cutter and arranged in so close proximity to the edge of said cutter, that only the unembroidered part of the work can pass between said work table and cutter, and means laterally of said cutter for feeding the work forwardly and the festooned part thereof laterally against the cutting edge of said cutter.

22. A machine for partially separating the festooned part from the unembroidered part of embroidered work comprising a rotatable cutter whose cutting edge corresponds to the festoon and is notched at intervals, a platen roller coacting therewith, a concave work table concentric with said cutter and arranged in so close proximity to the edge of said cutter that only the unembroidered part of the work can pass between said work table and cutter, and rotatably driven rollers arranged laterally of said cutter and inclined thereto, adapted to take the work between them and feed it forwardly and the festooned part thereof laterally against the cutting edge of said cutter.

23. A machine for partially separating the festooned part from the unembroidered part of embroidered work, comprising a carrier arm, a rotatably driven cutter carried thereby whose cutting edge corresponds to the festoon and is notched at intervals, a platen roller coacting therewith, a concave work table concentric with said cutter and arranged in close proximity thereto, fixed bearings depending from said carrier arm at one side of said cutter, idle rollers rotatable in said bearings and inclined at an angle to said cutter, adjustable rollers co-operating with said idle rollers and adapted to hold the work between them and said idle rollers respectively, said adjustable rollers being inclined at an angle to said cutter corresponding to said idle rollers, and means for rotating said adjustable rollers.

24. A machine for partially separating the festooned part from the unembroidered part of embroidered work comprising a rotatable cutter whose cutting edge corresponds to the festoon and is notched at intervals, a platen roller coacting therewith, a concave work table concentric with said cutter, mechanism for vertically adjusting said work table into close proximity to the edge of said cutter and means laterally of said cutter for feeding the work forwardly and the festooned part thereof laterally against the cutting edge of said cutter.

25. A machine for partially separating the festooned part from the unembroidered part of embroidered work comprising a rotatable cutter whose cutting edge corresponds to the festoon and is notched at intervals, a platen roller coacting therewith, a concave work table concentric with said cutter, mechanism for vertically adjusting said work table into close proximity to the edge of said cutter and rotatably driven rollers arranged laterally of said cutter and inclined thereto, adapted to take the work between them and feed it forwardly and the festooned part thereof laterally against the cutting edge of said cutter.

26. A machine for partially separating the festooned part from the unembroidered part of embroidered work comprising a rotatable cutter whose cutting edge corresponds to the festoon and is notched at intervals, a platen roller coacting therewith, a concave work table concentric with said cutter, and arranged in so close proximity to the edge of said cutter that only the unembroidered part of the work can pass between said work table and cutter, means laterally of said cutter for feeding the work forwardly and the festooned part thereof laterally against the cutting edge of said cutter and an adjustable straight edge for guiding the festoon toward and in proper alinement with said cutter.

27. A machine for partially separating the festooned part from the unembroidered part of embroidered work, comprising a rotatable cutter whose cutting edge corresponds to the festoon and is notched at intervals, a platen roller coacting therewith, a concave work table concentric with said cutter and arranged in so close proximity to the edge of said cutter that only the unembroidered part of the work can pass between said work table and cutter, rotatably driven rollers arranged laterally of said cutter and inclined thereto, adapted to take the work between them and feed it forwardly and the festooned part thereof laterally against the cutting edge of said cutter, and an adjustable straight edge for guiding the festoon toward and in proper alinement with said cutter.

In witness whereof I have hereunto set my hand in the presence of two witnesses.

HEINRICH SPÜHL.

Witnesses:
EUGENE NABEL,
WILHELM ZÜNF.